US010769555B2

(12) United States Patent
Wild et al.

(10) Patent No.: US 10,769,555 B2
(45) Date of Patent: Sep. 8, 2020

(54) PERFORMING ACTIONS IN RESPONSE TO CHARGING EVENTS

(71) Applicant: Recargo, Inc., Venice, CA (US)

(72) Inventors: Nick Wild, Venice, CA (US); Forrest North, Redwood City, CA (US)

(73) Assignee: RECARGO, INC., El Segundo, CA (US)

( * ) Notice: Subject to any disclaimer, the term of this patent is extended or adjusted under 35 U.S.C. 154(b) by 0 days.

(21) Appl. No.: 15/155,704

(22) Filed: May 16, 2016

(65) Prior Publication Data
US 2016/0334234 A1 Nov. 17, 2016

Related U.S. Application Data

(60) Provisional application No. 62/162,270, filed on May 15, 2015.

(51) Int. Cl.
G06Q 10/02 (2012.01)
G01C 21/36 (2006.01)
B60L 53/60 (2019.01)
B60L 58/12 (2019.01)

(52) U.S. Cl.
CPC ............ G06Q 10/02 (2013.01); B60L 53/60 (2019.02); B60L 58/12 (2019.02); G01C 21/3697 (2013.01)

(58) Field of Classification Search
CPC . G06Q 10/02; G01C 21/3697; B60L 11/1861; B60L 11/1838
See application file for complete search history.

(56) References Cited

U.S. PATENT DOCUMENTS

| | | | | |
|---|---|---|---|---|
| 9,346,365 | B1* | 5/2016 | Penilla | B60L 11/18 |
| 9,714,837 | B2* | 7/2017 | North | G01C 21/3469 |
| 2013/0179061 | A1* | 7/2013 | Gadh | B60L 53/30 |
| | | | | 701/123 |
| 2013/0222158 | A1* | 8/2013 | Dai | B60L 53/63 |
| | | | | 340/995.13 |
| 2013/0226441 | A1* | 8/2013 | Horita | G01C 21/3469 |
| | | | | 701/118 |
| 2015/0039391 | A1* | 2/2015 | Hershkovitz | G06Q 10/04 |
| | | | | 705/7.31 |
| 2015/0069970 | A1* | 3/2015 | Sarkar | B60L 11/1816 |
| | | | | 320/109 |
| 2015/0226572 | A1* | 8/2015 | North | G01C 21/3469 |
| | | | | 701/400 |
| 2015/0294228 | A1* | 10/2015 | Saito | G06Q 10/04 |
| | | | | 706/48 |

* cited by examiner

Primary Examiner — Mary Cheung
(74) Attorney, Agent, or Firm — AMPACC Law Group, PLLC

(57) ABSTRACT

Systems and methods for performing actions in response to charging events, such as charging events associated with a specific electric vehicle and/or a specific charging station, are described. In some embodiments, the systems and methods may receive a request from an electric vehicle to identify a charging station from which to charge a battery of the electric vehicle, provide information associated with the electric vehicle to one or more charging stations proximate to the electric vehicle, receive from the one or more charging stations information identifying parameters associated with potential charging events provided by the one or more charging stations, and provide the information identifying the parameters associated with potential charging events provided by the one or more charging stations to the electric vehicle.

9 Claims, 7 Drawing Sheets

PERFORMING ACTIONS IN RESPONSE TO CHARGING EVENTS

This application claims priority to U.S. Provisional Patent Application No. 62/162,270, filed on May 15, 2015, entitled PERFORMING ACTIONS IN RESPONSE TO CHARGING EVENTS, which is hereby incorporated by reference in its entirety.

BACKGROUND

Although the adoption of electric vehicles is increasing, there are still many people that find them confusing or inaccessible, or are otherwise not interested in using electric vehicles for their transportation needs. Therefore, technology is being developed to remove such barriers associated with the adoption of electric vehicles.

DETAILED DESCRIPTION

Overview

Systems and methods for performing actions in response to charging events, such as charging events associated with a specific electric vehicle and/or a specific charging station, are described. Further, systems and methods for bidding and/or establishing parameters for future or requested charging events, are described.

In some embodiments, the systems and methods may receive a request from an electric vehicle to identify a charging station from which to charge a battery of the electric vehicle, provide information associated with the electric vehicle to one or more charging stations proximate to the electric vehicle, receive from the one or more charging stations information identifying parameters associated with potential charging events provided by the one or more charging stations, and provide the information identifying the parameters associated with potential charging events provided by the one or more charging stations to the electric vehicle.

In some embodiments, the systems and methods may determine an electric vehicle is below a battery capacity threshold, obtain from one or more charging stations information identifying parameters associated with potential charging events provided by the one or more charging stations, and automatically select one of the charging stations to charge the electric vehicle based on the information identifying parameters associated with potential charging events provided by the one or more charging stations.

It is intended that the terminology used in the description presented below be interpreted in its broadest reasonable manner, even though it is being used in conjunction with a detailed description of certain specific embodiments of the system. Certain terms may even be emphasized below; however, any terminology intended to be interpreted in any restricted manner will be overtly and specifically defined as such in this Detailed Description section.

Suitable System

Figure 1:
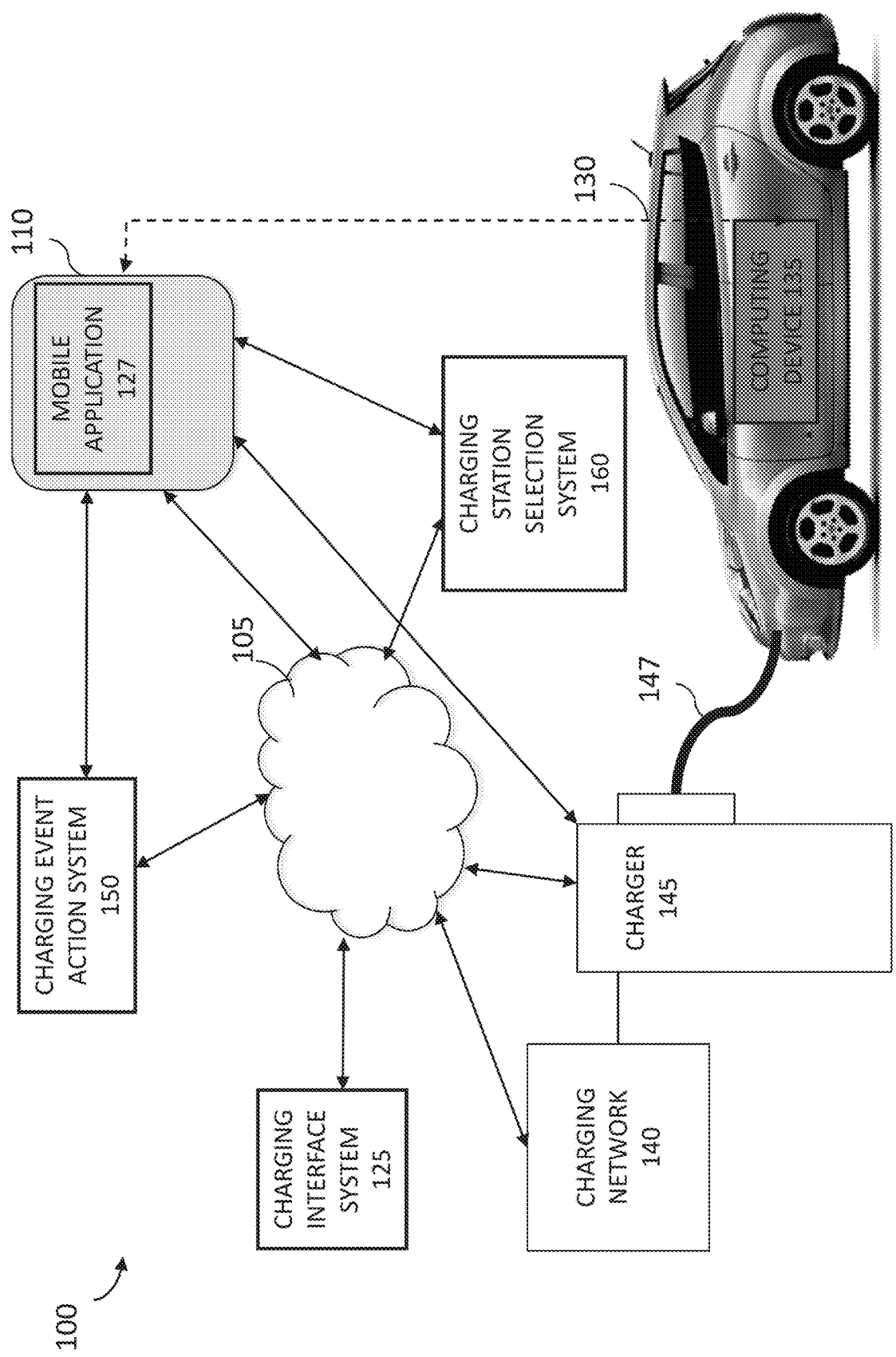
FIG. 1 is a block diagram illustrating components of a suitable computing environment.

Systems and methods for performing actions in response to charging events and/or in response to a request for a charging event are described. FIG. 1 illustrates components of a suitable computing environment 100 in which the systems and methods for performing actions associated with potential and/or completed charging events may be supported and/or implemented.

The computing environment 100 includes a mobile device 110, such as a mobile phone or tablet computer that supports and provides applications (e.g., "apps") to a user of the mobile device 110. For example, the mobile device 110 may include a mobile application 127 provided by a charging interface system 125. The mobile application 127 may communicate with the charging interface system 125, one or more charging networks 140, a charging station 145, and/or a computing device 135 supported by an electric vehicle 130, over a network 105, such as the internet or other wireless or telecommunication networks. The electric vehicle (EV) 130 (e.g., a vehicle, plugin hybrid, range extended hybrid, electric traction or battery or plugin vehicle) is connected to the charging station 145 via a charging cable 147, which provides charge to a battery pack of the EV 130.

The mobile device 110 may be a tablet computer, mobile device, smart-phone, net-book, mobile GPS navigation device, or any other device that supports, presents, and/or displays apps via a user interface, such as a touch-screen, of the device. The mobile device 110 includes various hardware and/or software components in order to provide such functionality. For example, the mobile device 110 includes various human interface components, device components, and memory, and so on.

The mobile device 110 may include a touch-screen or other input component that provides input to a processor. The touch-screen may include or communicate with a hardware controller, such as a touch-screen driver, that interprets raw signals received from the touch-screen and transmits information associated with a contact event (e.g., a pressing of an app via the touch-screen), to the processor. The touch-screen may be part of a display, such as a touch-screen display, a flat panel display, an electronic ink display, a head-mounted display, a liquid crystal display, a light-emitting diode display, a plasma panel display, an electroluminescent display, a vacuum fluorescent display, a digital projector, a laser projector, a heads-up display, and so on. The mobile device 110 may include other interface components, such as a speaker that provides appropriate auditory signals to assist a user in navigating a touch-screen, and so on.

The mobile device 110 may include various device components, such as sensors (e.g., GPS or other location determination sensors, motion sensors, gyroscopes, light sensors, and so on), removable storage devices (e.g., SIM cards), cameras and other video capture devices, microphones and other audio capture devices, communication devices (e.g., Bluetooth devices, radios, antennas), and so on.

The mobile device 110 may include a processor that communicates with data or applications stored in memory of the device 110, which may include a combination of temporary and/or permanent storage, and both read-only and writable memory (random access memory or RAM), read-only memory (ROM), writable non-volatile memory such as FLASH memory, hard drives, floppy disks, SIM-based components, and so on. The memory may include various program components or modules, such as an operating system, and various applications, such as applications downloaded to the device 110. For example, the memory may store applications native to the device that perpetually operate on the device (e.g., a keyboard application that provides a virtual keyboard, a text messaging application, and so on) as well as applications that are downloaded by a user and launched by the device (e.g., applications associated with social networking sites, games, and so on).

The memory may store one or more applications associated with an electric vehicle, such as the mobile application 127, which facilitates communications between the mobile device 110 and an electric vehicle 130, the computing device 135 of the electric vehicle 130, the charging network 140, the charging station 145, and/or a server supporting the charging interface system 125.

For example, the mobile application 127 may communicate over the network 105 with the computing device 135 of the electric vehicle 130, the charging network 140, the charging station 145, and/or the charging interface system 125. The network 105 may be a Local Area Network (LAN), a Wide Area Network (WAN), the Internet, or other networks capable of facilitating various communications between computing devices.

In some example embodiments, the mobile application 127 may communicate directly with various components of the computing environment 100. The mobile device 110 may include various communication components (e.g., Bluetooth) that facilitate short range, near field, and/or other direct or personal area network communications between devices. For example, the mobile application 127 may utilize Bluetooth communication to exchange data with the charging network 140 and/or the charging station 145 when other networks are unavailable or inaccessible (e.g., when the EV 130 is at the charging station 145 in an underground parking lot that does not receive sufficient wireless or telecommunication signals).

The computing device 135 of the electric vehicle 130 may include various computing components and/or modules configured and/or programmed to control, manage, diagnose, or otherwise interact with components of the electric vehicle 130. For example, the EV computing device 135 may include an on-board computing system that includes on-board diagnostics, such as components configured and/or programmed to detect and/or receive information from the electric vehicle's engine, battery pack, various sensors, dashboard controls, and so on. The components may detect, sense, and/or capture various types of information, such as outside temperature information, inside temperature information, internal engine or component temperatures, motor rpm information, motor temperature information, power consumption information, charger temperature information, information associated with peak power consumption, location or geographical information, tire pressure information, tire temperature information, information captured by seat pressure sensors, error codes or other operational information, and so on. For example, the components may detect, receive, and/or access motor controller information, such as information associated with the power, voltage, current, frequency, waveform, modulation, and/or regenerative power of the motor of the EV, as well as information from modules which control ancillary functions of the EV, such as information associated with operations of the lights, wipers, anti-lock brakes, seat warmers, music, climate controls, light sensors, smoke sensors, acceleration sensors, and other ancillary operations of an EV.

In some example embodiments, the computing environment 100 includes a charging event action system 150 that performs actions in response to charging events, and/or a charging station selection system 160 that selects charging stations and/or networks for charging events. The charging event action system 150 and the charging station selection system 160 are described in more detail herein.

FIG. 1 and the discussion herein provide a brief, general description of a suitable computing environment in which the charging interface system 125 can be supported and implemented. Although not required, aspects of the system are described in the general context of computer-executable instructions, such as routines executed by a general-purpose computer, e.g., mobile device, a server computer, or personal computer. Those skilled in the relevant art will appreciate that the system can be practiced with other communications, data processing, or computer system configurations, including: Internet appliances, hand-held devices (including tablet computers and/or personal digital assistants (PDAs)), all manner of cellular or mobile phones, multi-processor systems, microprocessor-based or programmable consumer electronics, set-top boxes, network PCs, mini-computers, mainframe computers, and the like. Indeed, the terms "computer," "host," and "host computer," and "mobile device" and "handset" are generally used interchangeably herein, and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the system may be stored or distributed on computer-readable media (e.g., physical and/or tangible computer-readable storage media, such as non-transitory media), including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the system may be distributed over the Internet or over other networks (including wireless networks) or they may be provided on any analog or digital network (packet switched, circuit switched, or other scheme). Those skilled in the relevant art will recognize that portions of the system reside on a server computer, while corresponding portions reside on a client computer such as a mobile or portable device, and thus, while certain hardware platforms are described herein, aspects of the system are equally applicable to nodes on a network. In an alternative embodiment, the mobile device or portable device may represent the server portion, while the server may represent the client portion.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein. Moreover, any two or more of the machines, databases, or devices illustrated in FIG. 1 may be combined into a single machine, and the functions described herein for any single machine, database, or device may be subdivided among multiple machines, databases, or devices.

Examples of Performing Actions Based on Charging Events

As described herein, the charging event action system 150 includes components, modules, and/or engines that perform various algorithms, processes, and/or methods to perform actions in response to completed charging events at charging stations, such as charging events associated with a single electric vehicle, a group of electric vehicles, all electric vehicles of a certain type or make, and/or all electric vehicles.

Figure 2:
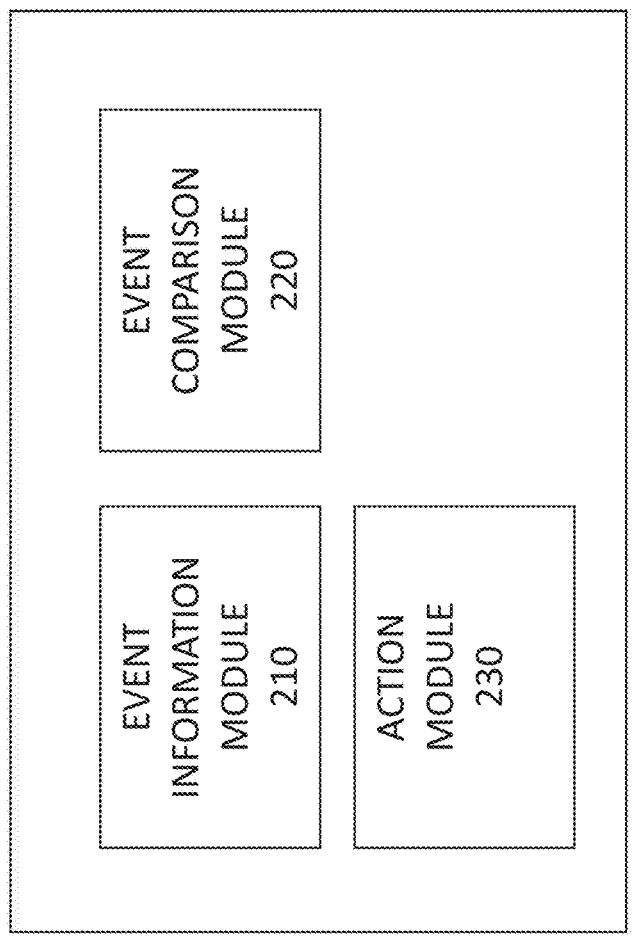
FIG. 2 is a block diagram illustrating the components of a charging event action system.

FIG. 2 is a block diagram illustrating the components of the charging event action system 150. In some example embodiments, the charging event action system 150 may include one or more modules and/or components to perform one or more operations of the charging event action system 150. The modules may be hardware, software, or a combination of hardware and software, and may be executed by one or more processors. For example, the charging event action system 150 may include an event information module 210, an event comparison module 220, and an action module 230.

In some embodiments, the event information module 210 is configured and/or programmed to access information associated with a completed charging event for the electric vehicle. For example, the event information module 210 may access or receive event cost information, event duration information, event context information, and so on.

In some embodiments, the event comparison module 220 is configured and/or programmed to compare the information associated with the completed charging event to information associated with other previous charging events for the electric vehicle. For example, the information associated with the charging event may identify a total charge applied to the battery of the electric vehicle, a rate of charging the batter, and so on.

In some embodiments, the action module 230 is configured and/or programmed to perform an action in response to the comparison. For example, the action module 230 may rank or otherwise assign metrics or grades to the completed charging event based on comparisons with other charging events for the electric vehicle. For example, the action module 230 may determine that the assigned metrics represent decreasing charging capabilities for the electric vehicle, indicating the health of the battery of the electric vehicle may be degrading.

Figure 3:
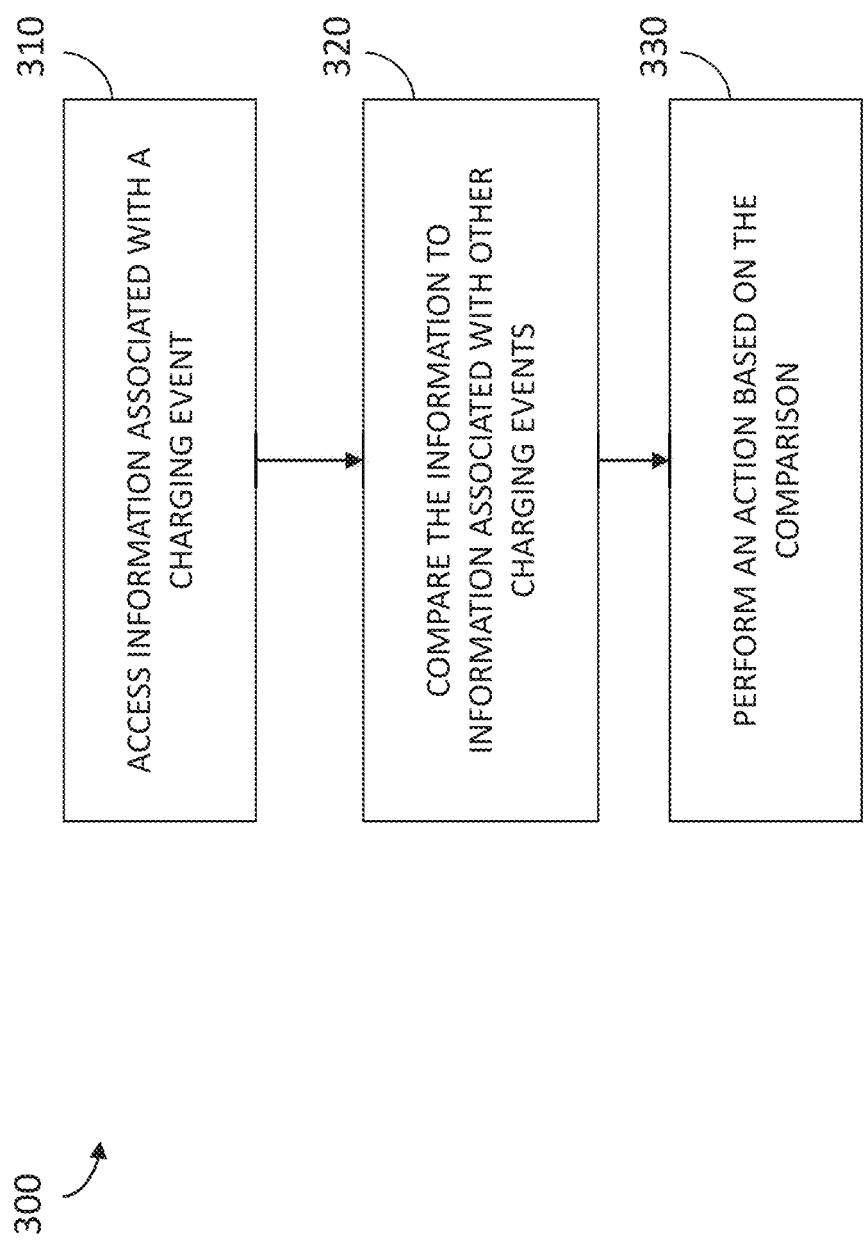
FIG. 3 is a flow diagram illustrating a method for performing an action based on a charging event.

FIG. 3 is a flow diagram illustrating a method 300 for performing an action based on a charging event. The method 300 may be performed by the charging event action system 150 and, accordingly, is described herein merely by way of reference thereto. It will be appreciated that the method 300 may be performed on any suitable hardware.

In operation 310, the charging event action system 150 accesses information associated with a completed charging event for the electric vehicle. For example, the event information module 210 may access information that is associated with an electric vehicle that received charge during the completed charging event and information associated with a charging station that provided the charge to the electric vehicle during the completed charging event.

In operation 320, the charging event action system 150 compares the information associated with the completed charging event to information associated with other previous charging events for the electric vehicle, and/or other electric vehicles of a similar type or make of the electric vehicle.

In operation 330, the charging event action system 150 performs an action in response to the comparison. For example, the action module 230 may assign a ranking for the completed charging event with respect to the previous charging events for the electric vehicle and/or rate the completed charging event with respect to other charging events previously completed at a charging station that charged the electric vehicle during the completed charging event.

As another example, the action module 230 may provide an indication (e.g., a battery health score) associated with a determined health of the battery of the electric vehicle based on the comparison. For example, the action module 230 may compare a current charging event ranking of "fair" to previous charging event rankings of "good," "good," and "fair" for an electric vehicle at a single charging station, and assign a battery health score of "degrading" or "low" to the battery of the electric vehicle.

Figure 4:
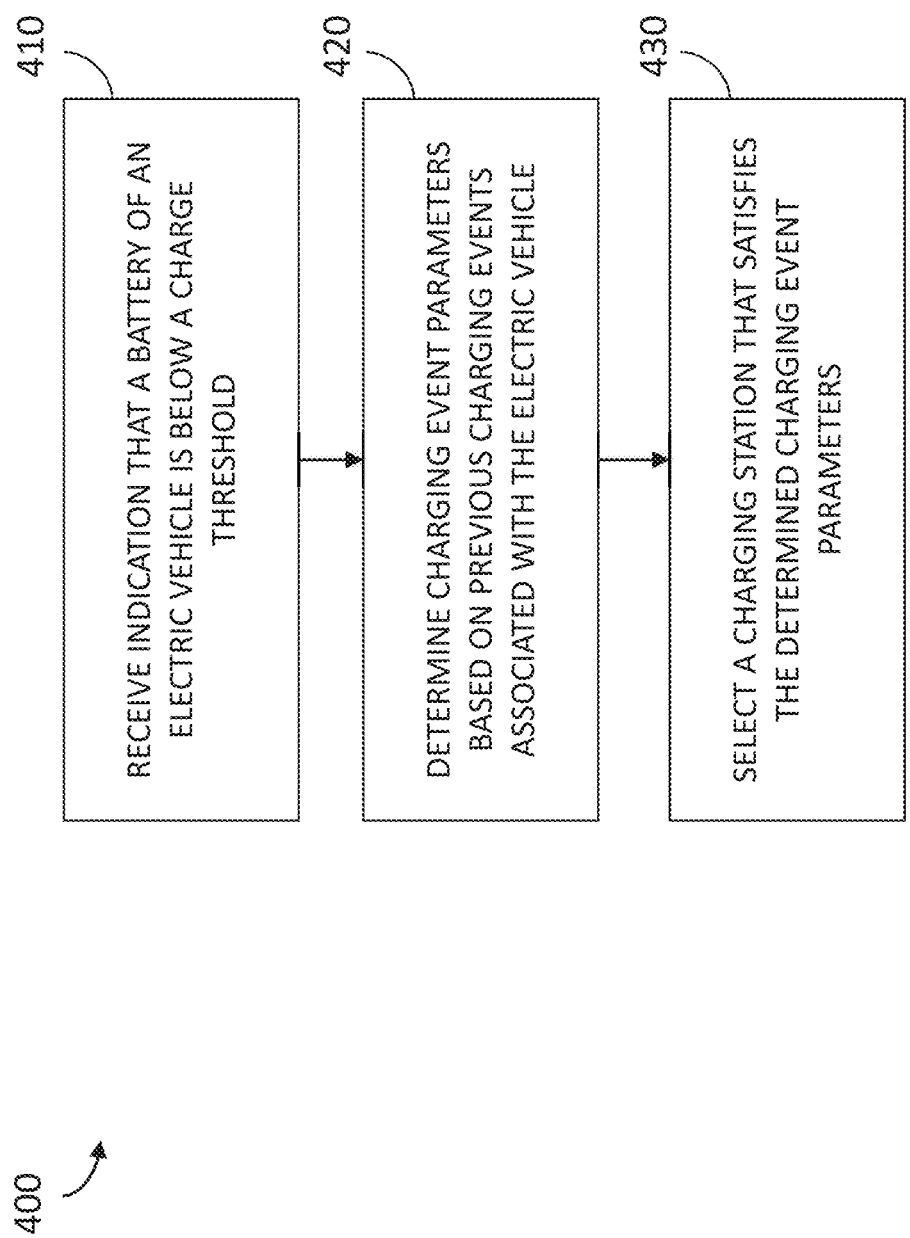
FIG. 4 is a flow diagram illustrating a method for selecting a charging station to charge an electric vehicle based on previous charging events associated with the electric vehicle.

As described herein, in some embodiments, the charging event action system 150 may automatically register an electric vehicle with a station that can provide a suitable charging event based on a history of charging events for the vehicle. FIG. 4 is a flow diagram illustrating a method 400 for selecting a charging station to charge an electric vehicle based on previous charging events associated with the electric vehicle or other vehicles.

In operation 410, the charging event action system 150 receives an indication that a battery of an electric vehicle is below a sufficient charge threshold. For example, the charging event action system 150 may receive information from computing device 135 that identifies a current level of charge is below a threshold level for a current or predicted route of travel or trip.

In operation 420, the charging event action system 150 determines charging event parameters for the electric vehicle that are based on a historical performance of previous charging events associated with the same electric vehicle or other vehicles of a type similar to the type of the electric vehicle. In operation 430, the charging event action system 150 registers the electric vehicle with a charging station that satisfies the charging event parameters for the electric vehicle.

For example, the system 150 may determine that the charging station has successfully charged vehicles of different types (e.g., types similar to the type of the electric vehicle) during previous charging events, and authorize the charging station for use by the electric vehicle. Thus, the system 150 may determine charging parameters for a charging station, such as how much charge it can handle or provide, what type of adapter it may have, and so on, based on historical information identifying the types of vehicles and parameters of charging events at the charging station.

Of course, the charging event action system 150 may perform a variety of other complementary or other processes utilizing information accessed and/or received from charging events, such as vehicle information, charging station information, grid information, and so on.

In some embodiments, the event action system 150 may perform automatic check-in procedures, may determine a capacity of a charging station, may determine certain capabilities (real-time and/or historical) for charging stations, may verify the accuracy of an electric grid meter or other metering system, and so on. For example, the event action system 150 may perform actions associated with various components (e.g., other vehicles, charging stations, the electric grid and its sub-components, and so on) of the charging environment 100 using information associated with charging events.

Thus, the event action system 150, in some embodiments, utilizes information associated with vehicle charging events to identify characteristics associated with charging stations, battery health, and so on. By collecting data from many different charging events for many different electric vehicles (via the electric vehicles), the system 150 facilitates the matching of charging stations to electric vehicles, the identification of potential issues with batteries of electric vehicles, and other benefits.

Examples of Selecting Charging Stations for Charging an Electric Vehicle

As described herein, the charging station selection system 160 may select one or more charging stations based on an automatic selection process, or bidding (e.g., real-time auction or bidding) process that matches potential charging events provided by the charging stations to a current or predicted charging need of an electric vehicle or fleet of vehicles.

Figure 5:
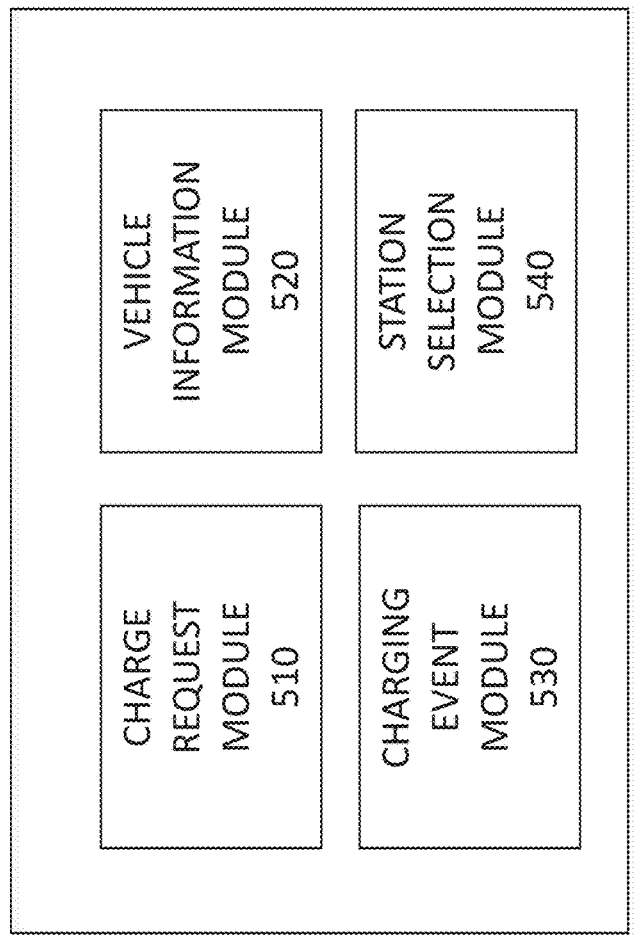
FIG. 5 is a block diagram illustrating the components of a charging station selection system.

FIG. 5 is a block diagram illustrating the components of the charging station selection system 160. In some example embodiments, the charging station selection system 160 may include one or more modules and/or components to perform one or more operations of the charging station selection system 160. The modules may be hardware, software, or a combination of hardware and software, and may be executed by one or more processors. For example, the charging station selection system 160 may include a charge request module 510, a vehicle information module 520, a charging event module 530, and a station selection module 540.

In some embodiments, the charge request module 510 is configured and/or programmed to receive a request from an electric vehicle to identify a charging station from which to charge a battery of the electric vehicle. The charge request module 510 may receive the request from the electric vehicle and/or vis the mobile application 127.

In some embodiments, the vehicle information module 520 is configured and/or programmed to provide information associated with the electric vehicle to one or more charging stations proximate to the electric vehicle. For example, the vehicle information module 520 may provide information identifying an amount of current charge of the battery and information identifying a predicted route currently driven by the electric vehicle and/or provide information identifying an amount of current charge of the battery, information identifying a distance between a current location of the electric vehicle and a predicted end point of a route currently driven by the electric vehicle, information identifying driver preferences, information identifying previous routes driver by the electric vehicle, and so on.

In some embodiments, the information identifying the parameters associated with potential charging events provided by the one or more charging stations to the electric vehicle includes information identifying a cost to charge the electric vehicle during a charging event, and/or includes information identifying a time frame and duration for charging the electric vehicle during a charging event. Examples of other information that may be provided includes vehicle route (e.g., predicted or otherwise) information, battery information, charging network membership information, and so on.

In some embodiments, the charging event module 530 is configured and/or programmed to receive from the one or more charging stations information identifying parameters associated with potential charging events provided by the one or more charging stations.

In some embodiments, the station selection module 540 is configured and/or programmed to provide the information identifying the parameters associated with potential charging events provided by the one or more charging stations to the electric vehicle. For example, the station selection module 540 may provide a ranked list of potential charging events to a driver of the electric vehicle, each charging event in the ranked list including a location of a charging station associated with the charging event and a cost to charge the battery of the electric vehicle to a sufficient capacity, or other types of information.

Figure 6:
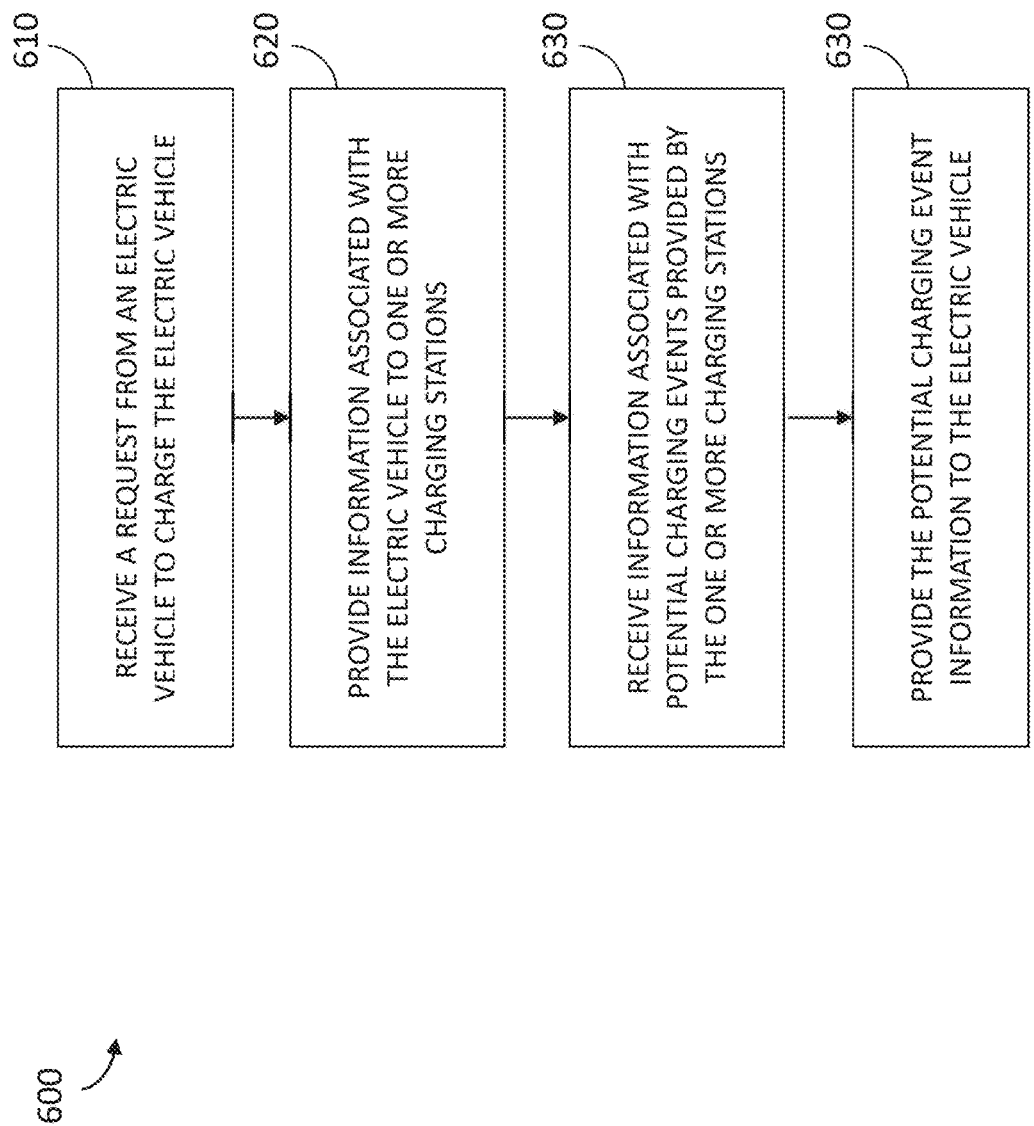
FIG. 6 is a flow diagram illustrating a method for presenting charging event information to an electric vehicle.

FIG. 6 is a flow diagram illustrating a method 600 for presenting charging event information (e.g., information representing bids to provide a charging event) to an electric vehicle. The method 600 may be performed by the charging station selection system 160 and, accordingly, is described herein merely by way of reference thereto. It will be appreciated that the method 600 may be performed on any suitable hardware.

In operation 610, the charging station selection system 160 receives a request from an electric vehicle to identify a charging station from which to charge a battery of the electric vehicle.

In operation 620, the charging station selection system 160 provides information associated with the electric vehicle to one or more charging stations proximate to the electric vehicle. For example, the vehicle information module 540 may provide information identifying an amount of current charge of the battery and information identifying a predicted route currently driven by the electric vehicle and/or provide information identifying an amount of current charge of the battery and information identifying a distance between a current location of the electric vehicle and a predicted end point of a route currently driven by the electric vehicle.

In some embodiments, the information identifying the parameters associated with potential charging events provided by the one or more charging stations to the electric vehicle includes information identifying a cost to charge the electric vehicle during a charging event, and/or includes information identifying a time frame and duration for charging the electric vehicle during a charging event. Examples of other information that may be provided includes vehicle route (e.g., predicted or otherwise) information, battery information, charging network membership information, and so on.

In some embodiments, the information associated with potential charging events may depend or be based on a current or previous utilization of associated charging stations. For example, a charging network may modify cost information in order to provide incentives to drivers to utilize associated charging stations during certain underutilized periods or at certain underutilized locations or areas that provide charging stations.

In operation 630, the charging station selection system 160 receives from the one or more charging stations information identifying parameters associated with potential charging events provided by the one or more charging stations.

In operation 640, the charging station selection system 160 provides the information identifying the parameters associated with potential charging events provided by the one or more charging stations to the electric vehicle. For example, the station selection module 540 may provide a ranked list of potential charging events to a driver of the electric vehicle, each charging event in the ranked list including a location of a charging station associated with the charging event and a cost to charge the battery of the electric vehicle to a sufficient capacity, or other types of information.

The system 160, therefore, may provide a list or other display of charging stations that is ranked or sorted based on a variety of determined factors, including:

A total route time, which is based on a determined time for traveling a route by the electric vehicle plus a determined time for charging the electric vehicle at a selected charging station, where various weighting factors may prioritize the travel time over the charging time and/or the charging time over the travel time;

A blended cost/time ranking, which is based on a weighted combination of cost to charge the electric vehicle at a selected charging station and the total route time to travel a predicted route while charging at the selected charging station; and so on.

Figure 7:
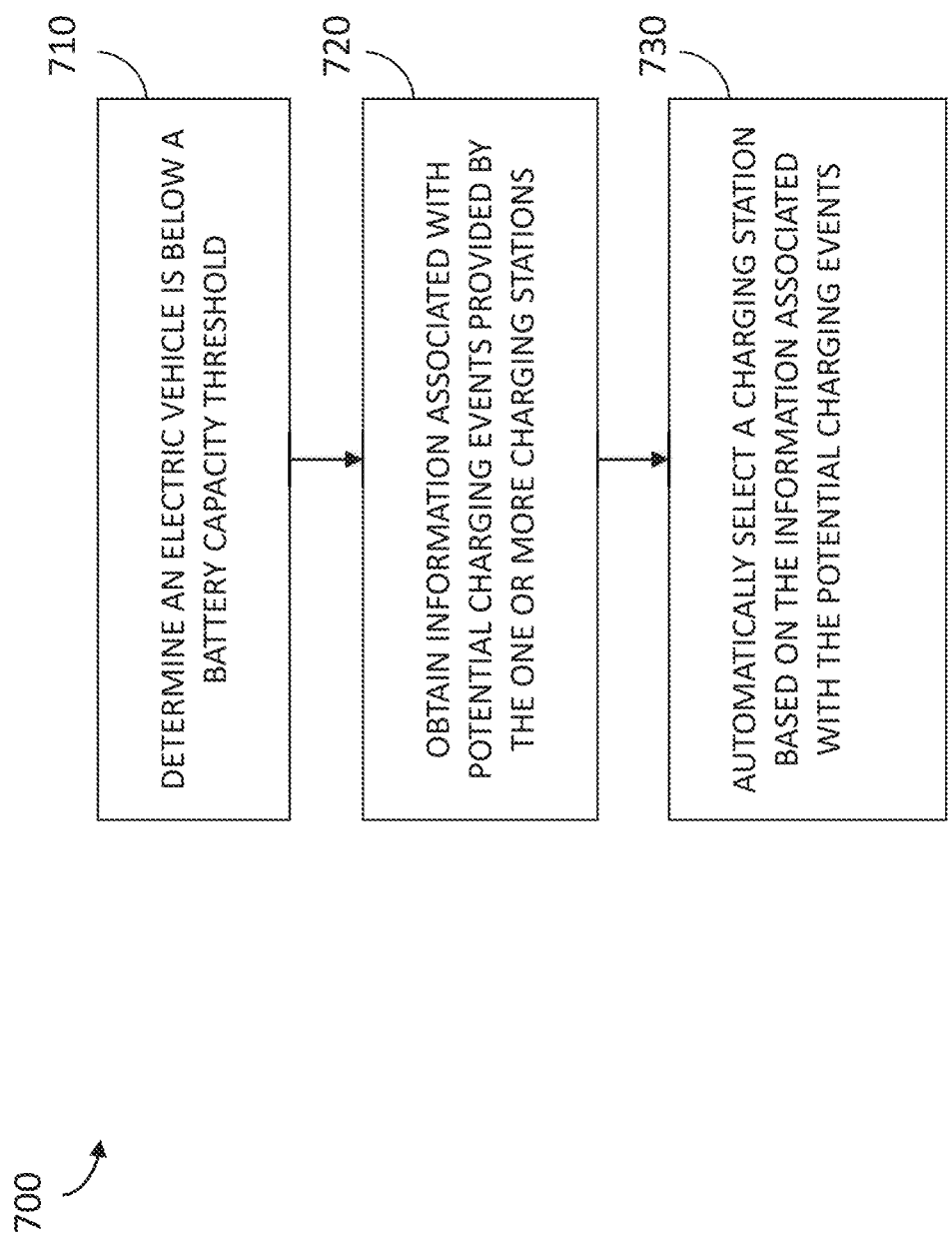
FIG. 7 is a flow diagram illustrating a method for automatically selecting a charging station to charge an electric vehicle.

As described herein, in some embodiments, the charging station selection system 160 may automatically or in real-time select or match a charging station for an electric vehicle for one or more future charging events. FIG. 7 is a flow diagram illustrating a method 700 for automatically selecting a charging station to charge an electric vehicle. The method 700 may be performed by the charging station selection system 160 and, accordingly, is described herein merely by way of reference thereto. It will be appreciated that the method 700 may be performed on any suitable hardware.

In operation 710, the charging station selection system 160 determines an electric vehicle is below a battery capacity threshold. For example, the vehicle information module 520 may identify a predicted route currently driven by the electric vehicle and determine an amount of current charge of the battery is less than a sufficient amount of charge to drive the electric vehicle on the predicted route and/or identify a distance between a current location of the electric vehicle and a predicted end point of a route currently driven by the electric vehicle and determine an amount of current charge of the battery is less than an sufficient amount of charge to drive the electric vehicle to the end point of the route currently driven by the electric vehicle.

In operation 720, the charging station selection system 160 obtains from one or more charging stations information identifying parameters associated with potential charging events provided by the one or more charging stations.

In operation 730, the charging station selection system 160 automatically selects one of the charging stations to charge the electric vehicle based on the information identifying parameters associated with potential charging events provided by the one or more charging stations. For example, the station selection module 540 may automatically select a charging station associated with a lowest cost to charge the battery of the electric vehicle to a charge amount that is above the battery capacity threshold.

Once the charging station selection system 160 selects a charging station, the charging station selection system 160 may also perform various actions to facilitate a charging event between the electric vehicle and the charging station, such as automatically reserve the electric vehicle to charge with the selected charging station, provide payment to a charging network associated with the charging station, provide confirmation information to a driver of the electric vehicle, provide ancillary information to the driver of the electric vehicle, and so on.

Thus, in some embodiments, the systems and methods described herein enable drivers of electric vehicles to be paired with preferred or suitable charging stations during or in advance of trips or routes of travel, among other benefits. Furthermore, by utilizing data collected from electric vehicles, the systems and methods may identify potential issues associated with certain charging stations, components of electric vehicles, and so on, and perform actions to alert drivers of the electric vehicles.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

While many embodiments described above employ software stored on the mobile device, the scripts and other software noted above may be hard coded into the mobile device (e.g. stored in EEPROM, PROM, etc.). Further, the above functionality may be implemented without scripts or other special modules.

The teachings of the system provided herein can be applied to other systems, not necessarily the system described above. The elements and acts of the various embodiments described above can be combined to provide further embodiments.

All of the above patents and applications and other references, including any that may be listed in accompanying filing papers, are incorporated by reference. Aspects of the system can be modified, if necessary, to employ the systems, functions, and concepts of the various references described above to provide yet further embodiments of the system.

These and other changes can be made to the system in light of the above Detailed Description. While the above description details certain embodiments of the system and describes the best mode contemplated, no matter how detailed the above appears in text, the system can be practiced in many ways. Details of the local-based support system may vary considerably in its implementation details, while still being encompassed by the system disclosed herein. As noted above, particular terminology used when describing certain features or aspects of the system should not be taken to imply that the terminology is being redefined herein to be restricted to any specific characteristics, features, or aspects of the system with which that terminology is associated. In general, the terms used in the following claims should not be construed to limit the system to the specific embodiments disclosed in the specification, unless the above Detailed Description section explicitly defines such terms. Accordingly, the actual scope of the system encompasses not only the disclosed embodiments, but also all equivalent ways of practicing or implementing the system under the claims.

While certain aspects of the system are presented below in certain claim forms, the inventors contemplate the various aspects of the system in any number of claim forms. Accordingly, the inventors reserve the right to add additional claims after filing the application to pursue such additional claim forms for other aspects of the system.

We claim:

1. A computerized method, comprising:
   determining an electric vehicle is below a battery capacity threshold;
   in response to the determination that the electric vehicle is below a battery capacity threshold, sending a request to multiple charging stations to charge the electric vehicle;
   obtaining from the multiple charging stations information identifying parameters associated with potential charging events provided by the multiple charging stations for charging the electric vehicle in response to the request,
      wherein the parameters associated with the potential charging events are dynamically determined by the multiple charging stations after and in response to receiving the request to charge the electric vehicle, and
      wherein the parameters associated with the potential charging events include parameters that identify whether one or more charging stations of the multiple charging stations have successfully charged electric vehicles having a similar make and model to the electric vehicle below the battery capacity threshold;
   automatically selecting one of the multiple charging stations to charge the electric vehicle based on the information identifying the parameters associated with potential charging events provided by the multiple charging stations; and
   automatically reserving the electric vehicle to charge with the selected charging station.

2. The method of claim 1, wherein determining an electric vehicle is below a battery capacity threshold includes:
   identifying a predicted route currently driven by the electric vehicle; and
   determining an amount of current charge of the battery is less than a sufficient amount of charge to drive the electric vehicle on the predicted route.

3. The method of claim 1, wherein determining an electric vehicle is below a battery capacity threshold includes:
   identifying a distance between a current location of the electric vehicle and a predicted end point of a route currently driven by the electric vehicle; and
   determining an amount of current charge of the battery is less than a sufficient amount of charge to drive the electric vehicle to the end point of the route currently driven by the electric vehicle.

4. The method of claim 1, wherein automatically selecting one of the multiple charging stations to charge the electric vehicle based on the information identifying parameters associated with potential charging events provided by the multiple charging stations includes automatically selecting a charging station associated with a lowest cost to charge the battery of the electric vehicle to a charge amount that is above the battery capacity threshold but below a total charge capacity of the battery.

5. A non-transitory computer-readable medium whose contents, when executed by a computing system of an electric vehicle causes the computing system to perform a method, the method comprising:
   determining a battery of the electric vehicle is below a battery capacity threshold suitable to support a route of travel predicted to be driven by the electric vehicle within a certain time period;
   obtaining from multiple charging stations information identifying parameters associated with potential charging events to be provided by the one or more charging stations,
      wherein the information is obtained in response to a request sent to the multiple charging stations upon determining the battery of the electric vehicle is below the battery capacity threshold, and
      wherein at least one of the charging stations dynamically generates parameters associated with a potential charging event at the one charging station in response to the request;
   presenting a ranked list of the potential charging events to a driver of the electric vehicle based on the parameters associated with the potential charging events,
      wherein the parameters for each potential charging event include:
         a location of the charging station that charges the electric vehicle during the potential charging event,
         a cost to charge the battery of the electric vehicle to a capacity that is sufficient to support the route of travel predicted to be driven by the electric vehicle within the certain time period buy lower than a full capacity of the battery of the electric vehicle, and
         an indication that the charging station has successfully charged electric vehicles having a similar make and model to the electric vehicle during previous charging events; and
   selecting one of the multiple charging stations to charge the electric vehicle based on the ranked list of the potential charging events presented to the driver of the electric vehicle.

6. The computer-readable medium of claim 5, wherein determining an electric vehicle is below a battery capacity threshold includes:
   identifying a predicted route currently driven by the electric vehicle; and determining an amount of current charge of the battery is less than a sufficient amount of charge to drive the electric vehicle on the predicted route;

wherein automatically selecting one of the charging stations to charge the electric vehicle includes automatically selecting a charging station located within the route currently driven by the electric vehicle.

7. The computer-readable medium of claim 5, wherein determining an electric vehicle is below a battery capacity threshold includes:

identifying a distance between a current location of the electric vehicle and a predicted end point of a route currently driven by the electric vehicle; and determining an amount of current charge of the battery is less than a sufficient amount of charge to drive the electric vehicle to the end point of the route currently driven by the electric vehicle.

8. The computer-readable medium of claim 5, further comprising:

automatically reserving the electric vehicle to charge with the selected charging station.

9. The computer-readable medium of claim 5, wherein determining an electric vehicle is below a battery capacity threshold includes:

identifying a distance between a current location of the electric vehicle, locations of the multiple charging stations, and a predicted end point of a route currently driven by the electric vehicle; and determining an amount of current charge of the battery is less than a sufficient amount of charge to drive the electric vehicle to the end point of the route currently driven by the electric vehicle.

* * * * *